Oct. 7, 1958 G. S. HAVILAND 2,855,206
RESILIENT SPACER CONSTRUCTION FOR PLATE ASSEMBLY
Filed April 2, 1957 3 Sheets-Sheet 1
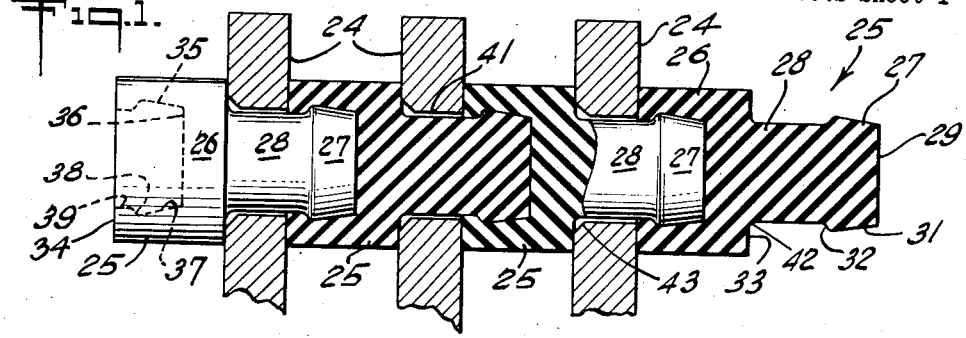
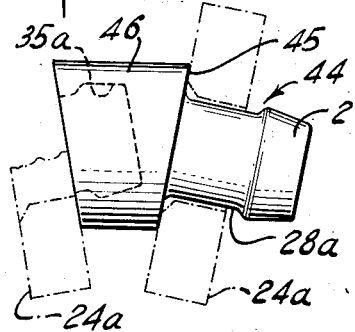
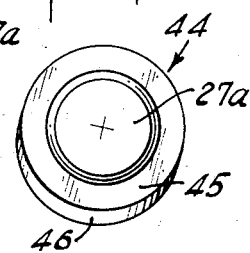
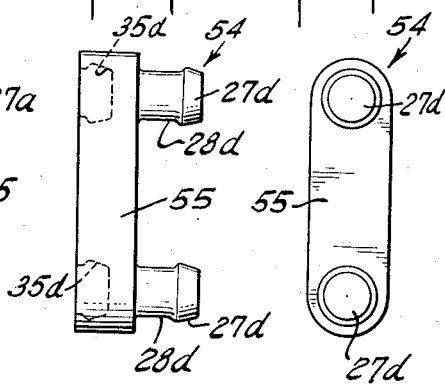
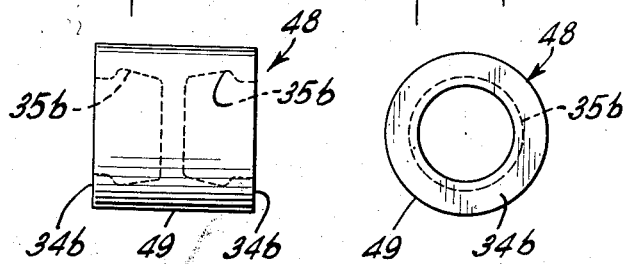
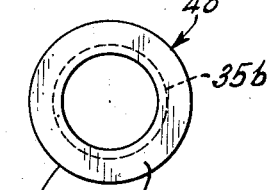
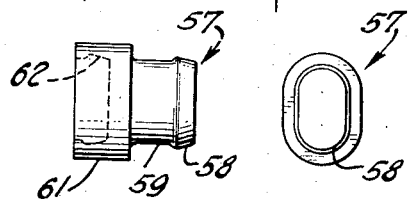
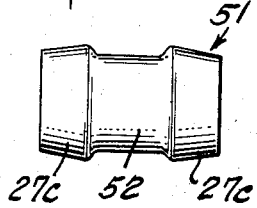
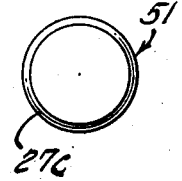
INVENTOR
GIRARD S. HAVILAND
BY
Raymond G. Mullee
ATTORNEY

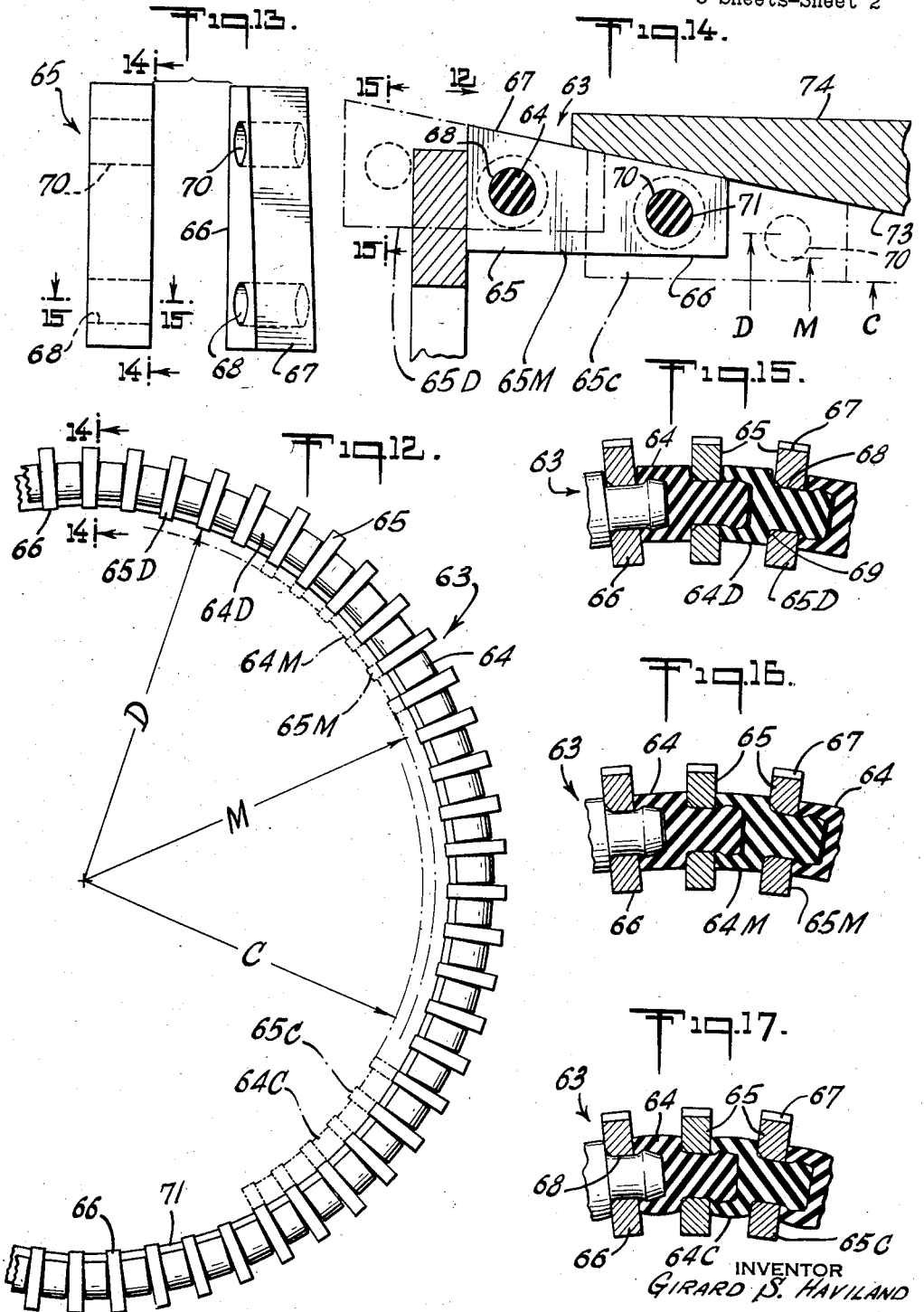

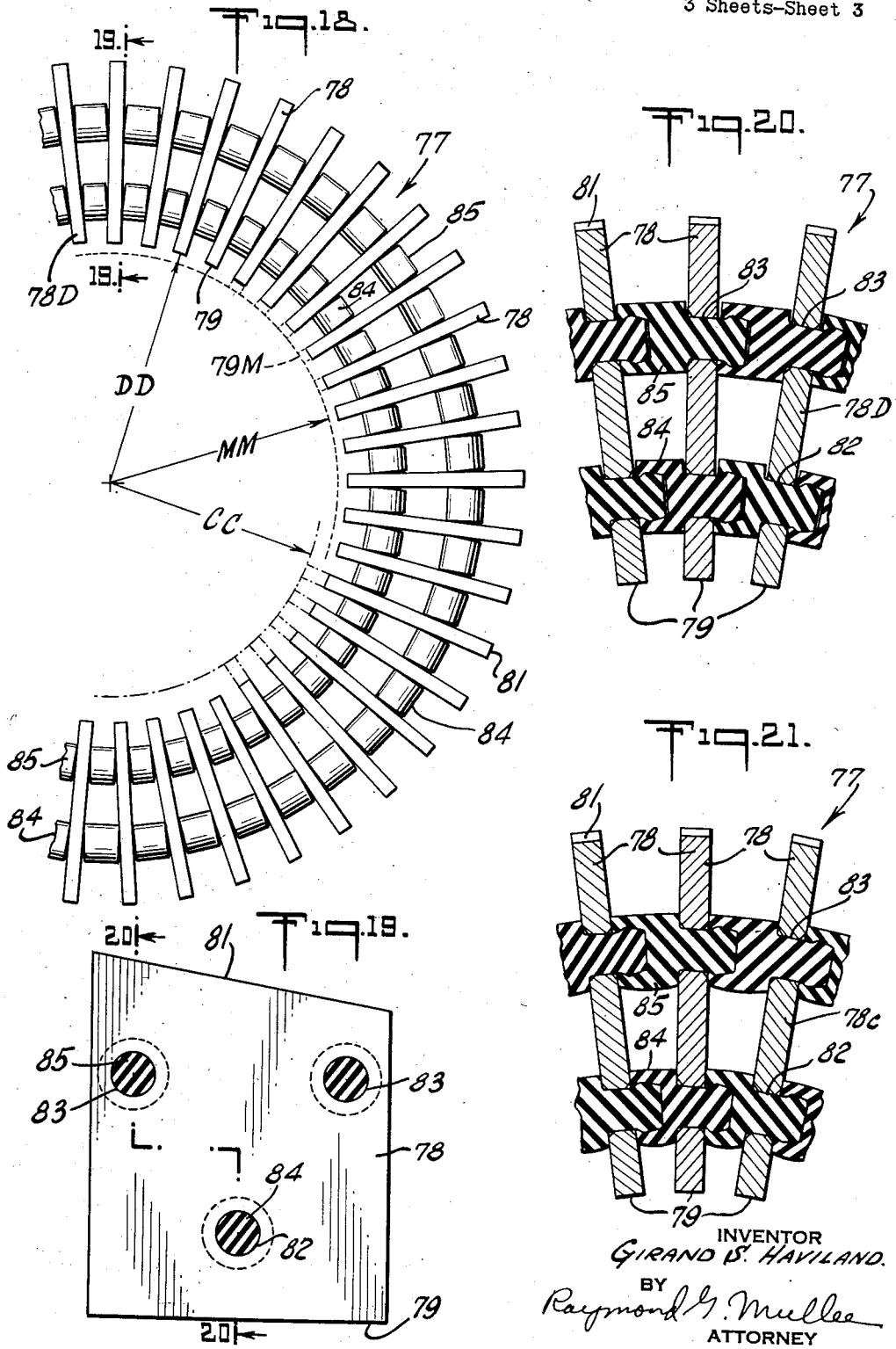

United States Patent Office 2,855,206
Patented Oct. 7, 1958

2,855,206

RESILIENT SPACER CONSTRUCTION FOR PLATE ASSEMBLY

Girard S. Haviland, Wethersfield, Conn., assignor to The Jacobs Manufacturing Company, West Hartford, Conn., a corporation of New Jersey Application April 2, 1957, Serial No. 650,185

15 Claims. (Cl. 279—1)

This invention relates to sectional resilient construction elements arranged to be assembled by successively joining one to another of similar construction. It has especial, though not exclusive, application to the resilient support of rigid plates, such as the gripping jaws of a chuck, in a predetermined spaced relation to each other, in such manner as to permit the relative positions of the plates to vary in accordance with a predetermined cycle of operation.

An object of the invention is the provision of a resilient link arranged to be joined to a similar link with a snap action to form a continuous rope or chain.

Another object is to so construct the link that the rope may flex under stress but will have elasticity at all points throughout its length tending to restore the rope to a straight line or other predetermined normal position when the stress is relieved.

A feature of the invention is a resilient link having a base portion with a socket therein and having a neck and plug portion adapted to fit within and completely fill the socket of a conjugate link. By completely filling the socket, the invention provides a uniformity of cross-section throughout the base portion and, therefore, uniformity of flexural elasticity.

A further object is the provision of a snap link of rubber-like material, having socket, plug and neck portions so conformed that one link may be attached to another by forcing them together to open the socket, after which the socket portion will close with a snap action and leave the links in the original unstressed conditions with the rubber relaxed.

A still further object is the provision of a resilient link having means for supporting rigid plates. In accordance with this object, a series of metal plates may be resiliently supported in spaced relation by mounting each plate upon the neck of a link and building up the structure by adding links and plates. Accordingly, an important feature in the invention resides in the construction of the neck of the link which is elongated to permit the reception of an apertured plate in surrounding relation to the neck and disposed in contacting relation between the base portion of one link and the base portion of the next.

Still another object is the provision of a collet, adapted to form part of a chuck, and having radially arranged jaws connected to each other by individual resilient spacer links.

Another object is to support the chuck jaws precisely in predetermined condition so that the workpiece will be uniformly gripped throughout its circumference and will be maintained at precisely the correct axis of revolution.

A further object is to permit the jaws of such a collet to move radially together and alternatively to restore them to expanded condition, under repeated cycles of operation, while maintaining the jaws at all times uniformly spaced apart and angularly arranged.

A still further object is to reduce the manufacturing cost of collets having rubber-like spacer elements between the jaws.

Still another object is the provision of a resilient spacer link adapted to form part of a collet of one selected size, and also interchangeable with the spacer links adapted to form parts of collets which greatly differ in size and design.

Other objects and features will appear more clearly from the following description taken in connection with the accompanying drawings and appended claims.

In the accompanying drawings:

Fig. 1 is a view chiefly in longitudinal section of an assembly of resilient spacer links and metal plates supported thereby in parallel planes;

Fig. 2 is a view in side elevation of a modified spacer link;

Fig. 3 is an end view of the modified spacer link as indicated by the arrow 3 in Fig. 2;

Fig. 4 is a view in side elevation of another modification of a spacer link;

Fig. 5 is an end view of the link shown in Fig. 4;

Fig. 6 is a view in side elevation of still another modified form of spacer link;

Fig. 7 is an end view of the spacer link of Fig. 6;

Fig. 8 is a view in side elevation of a further modification of spacer link, being of the duplex type;

Fig. 9 is an end view of the duplex link of Fig. 8;

Fig. 10 is a side elevational view of a still further modification of spacer link;

Fig. 11 is an end view of the link of Fig. 10;

Fig. 12 is a fragmentary view of a collet assembly comprising a toroidal chain of resilient spaced links interposed between metal jaws, and a second similar chain in the background, the collet being adapted to form part of a machine tool chuck;

Fig. 13 is a plan view, on an enlarged scale, of two adjacent metal jaws in the collet assembly of Fig. 12, the resilient spacer links being omitted;

Fig. 14 is a view in longitudinal section, on the same scale as Fig. 13, showing the collet of Fig. 12 in operative position as part of a machine tool chuck, the plane of the section being as indicated by the arrows 14 in Figs. 12 and 13;

Fig. 15 is a fragmentary cross-sectional view of the collet as indicated by the arrows 15 in Figs. 13 and 14 (broken line illustration), the condition of the collet being fully expanded and detached as in the full line position in Fig. 12;

Fig. 16 is a view similar to Fig. 15 but with the collet in its maximum size operating position in the machine tool chuck, corresponding to the position shown in dotted lines in Fig. 12, the section being indicated by the arrows 16 in the full line illustration of Fig. 14;

Fig. 17 is a view similar to Figs. 15 and 16 but with the collet compressed to its minimum operating size, corresponding to the position shown in the dot-dash lines in Fig. 12 and near the extreme right of Fig. 14;

Fig. 18 is a fragmentary view similar to Fig. 12 of a modified collet;

Fig. 19 is an enlarged view in longitudinal section of a portion of the modified collet as indicated by the arrows 19 in Fig. 18;

Fig. 20 is a cross-sectional view as indicated by the irregular line 20—20 in Fig. 19, the collet being in its detached condition; and Fig. 21 is a view similar to Fig. 20, but with the collet compressed to its minimum size.

In the description which follows, like numerals designate like parts, even though followed by a distinctive letter, in which case the distinction resides in the environment of the part, or its position at various different stages of operation, and not in the shape of the part itself.

Referring to Fig. 1, a plurality of flat plates 24, made of metal or other rigid material, are assembled in spaced parallel relation by means of a corresponding number of resilient links 25. Each spacer link is made of resilient material, such as synthetic rubber, and is shaped by a molding operation. The link 25 comprises a base portion 26, a plug portion 27 axially spaced therefrom by a substantial distance, and an elongated cylindrical neck portion 28 extending between the other portions. Each plug portion has a square end or flat radial face 29 at its front extremity, a long conical surface 31 diverging rearwardly from the flat face, and a short conical surface 32 converging rearwardly from the larger surface 31 and joining a cylindrical surface which defines the neck portion 28. The base portion 26 has a front face or shoulder 33 lying in a radial plane and extending from the neck to the cylindrical periphery of the base 26. The base has a rear face 34 lying in a plane which is radial or transverse, and therefore parallel to the faces 29 and 33 aforementioned. Extending through the rear face is a recess or socket 35 which is of complementary shape with relation to the plug portion 27 and a part of the neck portion 28. More specifically, the socket 35 has a bottom wall 36, a long conical surface 37 diverging rearwardly from wall 36, a short conical surface 38 converging rearwardly from the long surface 37, and a cylindrical mouth 39 extending between surfaces 38 and 34, all of the surfaces within the socket conforming in size and shape to the plug portion 27 and neck portion 28 except that the cylindrical mouth 39 is considerably shorter than the neck 28.

In the form of invention shown in Fig. 1, the various conical, cylindrical and flat faces are all co-axially arranged and the rubber links 25 are of identical construction. With this arrangement, the socket 35 of one link may be completely filled by the plug portion 27 and part of the neck 28 of the conjugate link; and any desired number of links may be firmly and snugly secured to each other to form a continuous chain or rope. One advantage of completely filling the socket 35 is that it provides uniformity of cross section throughout the base portion 26 and, therefore, a uniformity of deflection under stress.

As previously stated, the neck 28 is considerably longer than the cylindrical mouth 39 of the socket 35. This is an important feature of the invention because it permits an apertured metal plate 24 to be arranged in surrounding relation to the remaining part of the neck. As shown in Fig. 1, each plate has a hole 41 substantially the same in diameter as the neck 28 which it surrounds, whereby the plate could be swivelled about the axis of the spacer link if not restrained elsewhere. Preferably, the length of the neck 28 is equal or nearly equal to the combined axial length of the mouth 39 and the thickness of the plate 24, so that the plate is closely contacted by the rear face 34 on the base of one spacer link and the front face or shoulder 33 of the base on the conjugate link. The resilient spacer links 25 normally hold the plates 24 in uniformly spaced parallel relation as shown in Fig. 1. Upon application of external force between them, the plates will move relative to each other and assume different angular positions as the rubber links are deformed within the elastic limit. However, the rigid plates will automatically return to the original position as soon as the external force is removed.

To assemble the resilient spacer links 25 with each other and with the metal plates 24, the operator first pushes the plug portion 27 forward through the hole 41 of the adjacent plate 24. The long conical surface 31 preferably has the same diameter at its front end as the diameter of the neck 28 and, therefore, the front end of the plug 27 may start to enter the hole 41 without interference. As the resilient link is pushed forward, the long conical surface 31 guides or centers the spacer link 25 in the hole until the diameter at the point of entry increases to the diameter of the hole, after which the plug 27 must be forced through the hole by compressing the rubber. The compression is relieved after the plate has been assembled onto the spacer link, and the plug portion 27 then expands back to its original condition. In a similar manner, the plug is then forced through the socket 35 of the conjugate link. Assembly is facilitated by the fact that the mouth 39 of the forward spacer link expands outward as the plug portion 27 of the rearward link is contracted. After the mouth 39 passes over the large conical surface 31, it contracts in diameter causing the short conical surfaces 38 and 32 to ride over each other. The inward radial pressure of socket surface 38 on plug surface 32 produces a camming action which causes the two links to complete their relative axial movement with a snap action until the front wall 29 of the plug 27 abuts against the bottom wall 36 of the socket 35, and each spacer link 25 is restored to its original shape and unstressed condition, with the socket completely filled by the plug 27 and part of the neck 28. In the final assembled condition, the metal plate 24 abuts against, or lies closely adjacent to, both of the radial faces 34 and 33, but is not tightly gripped between the said faces and, therefore, does not react against the spacer links to stretch the neck 28 which it surrounds. The operation may be repeated indefinitely by adding links, with or without the addition of metal plates.

To disassemble, the operator holds one of the resilient spacer links 25 either by grasping its base portion 26 or by holding the adjacent plate 24 against the base of the link, and pulls on the link immediately in front of it. This produces stress along the short conical surface 38 on the socket forcing it outward and also along the short conical surface 32 on the plug forcing it inward at the same time. The combined expansion and contraction permits separation in a manner well understood.

Preferably, the short conical surfaces 32 and 38 have a steeper angle, or greater inclination with respect to the axis, than do the long conical surfaces 31 and 37, so that it requires more force to pull a pair of spacer links apart than it does to push them together. In the same manner, it requires greater force to pull a resilient spacer link out of the hole 41 of a metal plate 24 than it does to thread it into the hole.

If desired, the resilient spacer links 25 may be permanently and unremovably secured to each other by applying rubber cement to the walls of the socket 35. The fit between the socket and the plug and neck portions which fill up the socket provides a large area of contact for this purpose in a minimum amount of space.

For structural reasons, and to avoid fatigue failure, the neck 28 may be joined to the shoulder 33 by a rounded corner 42. In order to avoid interference between the rounded corner and the adjacent plate 24, the latter may be provided with a chamfer 43 at the adjacent end of hole 41.

Figs. 2 and 3 show a modified spacer link 44, having a plug portion 27a and a neck portion 28a of the same shape as the corresponding parts in Fig. 1. Adjacent to the neck, in a plane at right angles thereto, is a shoulder 45, similar to shoulder 43 but slightly elliptical at its periphery. Rearwardly of the shoulder 45 is a base portion 46, which is of cylindrical shape, but which has its axis at an obtuse angle to the axis of the plug 27a and neck 28a. Open at the rear of the base 46 is a socket 35a which has the same size and shape as the socket 35 of Fig. 1 but whose axis is inclined at an obtuse angle with respect to that of the base 46. As a result of the angular arrangement, the plates 24a supported by the modified grommet are normally supported at the angular relation shown in broken lines in Fig. 2, the included angle between the plates being the sum of the inclination between the axes of socket 35a and base 46, and the inclination between the axes of base 46 and neck 28a.

The spacer link in the modification of Fig. 2 may be assembled with another link of identical shape or alternatively with a link of the shape shown in Fig. 1. In the latter case, some of the metal plates will have an angular relation, as the plates 24a in Fig. 2, while other plates will be parallel as in Fig. 1.

Figs. 4 and 5 show another modification in which the spacer link 48 has a cylindrical base 49 extending between radial faces 34b at both its front and rear ends. At each end, the link 48 is recessed to provide a socket 35b having the same shape and dimensions as the socket 35 in the Fig. 1 form of invention. The spacer link of Figs. 4 and 5, of course, will not connect with another link of identical construction but it will receive within its socket 35b a plug portion 27 or 27a of a link as shown in Fig. 1 or Fig. 2 respectively.

Fig. 6 shows a further modification in which the resilient spacer link 51 has a neck portion 52 similar to the necks 28 and 28a of the first two embodiments, but provided at each end with a plug portion 27c which is of the same shape as the plug portions 27 and 27a of the first two forms of invention. The spacer link shown in Figs. 6 and 7 cannot be coupled to another link of identical structure but can be plugged into the socket 35, 35a or 35b respectively in the first three forms of invention.

Figs. 8 and 9 show a further modification in which the resilient spacer link 54 has an elongated base 55. The base has substantially the shape of a right parallelepiped rounded off at each end by a half cylinder. Projecting forwardly of base 55 in widely spaced relation are two neck portions 28d each terminating in a plug portion 27d, thus forming a duplex link. The base is provided at its rear face with a pair of sockets 35d, each in axial alignment with one of the necks 28d and plugs 27d. The sockets, necks and plugs may have the same shape and dimensions as the corresponding parts 35, 28 and 27 respectively in the form of invention of Fig. 1. The plugs 27d may be threaded into and through two spaced holes in a single plate, or alternatively, in separate plates, and then inserted simultaneously into the sockets 35d of the conjugate spacer link 54. Near the end of the assembly operation, the two sockets will restore simultaneously to their original condition with a snap action, each acting as in the case of a single socket in Fig. 1.

Figs. 10 and 11 show a further modification in which the resilient spacer link 57 has a plug portion 58, a neck portion 59 and a base portion 61, each generally similar to the corresponding portions 27, 28 and 26 respectively of Fig. 1, but having an oblong cross-section. As shown in Fig. 11, these portions have parallel sides and semicircular ends. The rear end of the base portion 61 is recessed to provide a socket 62, corresponding in function to the socket 35 of Fig. 1, but having an oblong cross-section so that the socket will receive, and will be filled by, the plug portion 58 and part of the neck portion 59 of the conjugate spacer link. The form shown in Figs. 10 and 11 is useful where the space is more limited in one direction (for example, horizontally) than in the other (vertical) and where it is desired to make the spacer link as large as space limitations permit. It is also useful in applications where it is desired to provide a greater resistance to movement in one direction than in the other direction. As will be apparent from Fig. 11, the spacer element 57 will yield more readily to a force bending it about a vertical axis than to a force bending at a horizontal axis. Another field of application for the spacer plug of Figs. 10 and 11 is an assembly having metal plates each of which receives a single spacer link and each of which requires means for preventing the plate from swiveling about the axis of the rubber spacer. The hole in such plate (not shown) is oblong to conform with the cross section of the neck 59.

The form of spacer link of Figs. 10 and 11, when joined by identical links to form an elongated rope, provides a structure which has elasticity of torsion as well as of flexure. Such a structure may be used in a flexible coupling for transmitting torque from link to link and from the links to the metal plates driven thereby.

In each of the six forms of invention shown in Figs. 1–11, the resilient spacer links 25, 44, 48, 51, 54 or 57 are restored by a snap action to their original shape upon completion of the assembly operation. After that time, they remain in unstressed condition until an external force is applied to the metal plates, whereupon the latter move relative to each other and thus temporarily deform the rubber within its elastic limit. Upon removal of such external force, the assembly returns to its original or normal condition, with all of the sockets completely filled but under no stress. The metal plates may be displaced and replaced repeatedly with consequent deformation and restoration of the rubber.

In each of the forms of invention heretofore described, the metal plates and spacer links may be built up section by section as described in connection with Fig. 1.

In certain forms of the invention, it is possible to turn one link about its axis in swivel relation to the conjugate link. The operator may take advantage of this fact to adjust the angular relation from time to time and thus minimize fatigue failure and prolong the endurance limit and life of the rubber, in cases where there is a repetition of strains in one particular direction more than another. This swiveling action is possible with the link of Fig. 1 when combined with an identical link or when combined with a link as shown in Figs. 2, 4, 6 or 8. It is not possible with the form of Fig. 10 with two identical links each having the form of Fig. 2.

Figs. 12–17 show the invention applied to a large size collet for a machine tool. The detached condition of the collet, disassociated from the rest of the chuck, is shown in Fig. 15 and in full lines in Fig. 12. Collet 63 comprises a large number of resilient spacer links 64, each having a construction like the link 25 of Fig. 1. The links are joined end-to-end to form a continuous rope and the ends of the rope are then brought together and joined to form a closed loop of substantially toroidal form. Clasped between adjacent links is a series of metal jaws 65. Each jaw consists of a flat metal plate of uniform thickness arranged in a plane radial to the axis of the collet 63. In the form shown, the jaw plate 65 is longer in an axial direction than it is radially of the collet, as seen in Figs. 13 and 14. Its inner edge 66 lies in a plane parallel to the axis of the collet so that the surfaces 66, if continued, would form a regular prism having as many faces as there are jaw plates. Its outer edge 67 lies in a plane at right angles to the plane of the jaw plate 65, being inclined to the inner edge 66 so that the surfaces 67, if continued, would form a regular pyramid having the same number of sides. Extending transversely of the jaw plate 65 and near the high end thereof, is a cylindrical bore 68 adapted to encircle the neck portion of an associated resilient spacer link 65. In the detached condition of the collet 63 apart from the machine tool enclosure, as shown in Figs. 12 and 15, the jaws 65 are resiliently spaced in desired relation by the ring of interlocked links 64 with the lateral faces of each plate abutting against the shoulder on one link and the end of the base on the other. The relation of the metal plates to the rubber links is the same as in Fig. 1 except that the links 64 are under some strain having been bent to form a toroidal structure. The hole 68 may be provided with a chamfered portion 69 (Fig. 15) for the same purpose as the chamfer 43 in Fig. 1.

Extending parallel to the hole 68, and located near the low end of the jaw plate 65, is a second hole or bore 70 adapted to encircle the neck portion of an associated resilient spacer link 71. Links 71 form a toroidal rope or endless chain similar to links 64. Preferably, each link 71 in its original condition, when detached from the jaw plate, is identical in construction, shape and dimensions with the first set of links 64. However, when the spacer links and jaw plates are assembled to provide a collet 63 as shown in Fig. 12, the links 71 are under slightly greater stress than links 64 because the toroidal ring which they form is of slightly less diameter with the same number of links.

Fig. 14 shows diagrammatically the collet 63 in operating condition as part of a machine tool assembly. The outer edge 67 of each jaw plate 65 is shown in engagement with the conical surface 73 in check body 74 which may be attached to a machine tool spindle (not shown). The inner edge 66 of each plate extends parallel to the axis of the collet 63 and of the chuck body 74 and forms a gripping edge adapted to engage a work piece (not shown). The radial edge at the high end of the jaw plate 65 abuts against a clamp ring 75. When the clamping ring is moved to the right, it causes the inclined outer edges 67 to ride over the cam surface 73 to bring the inner edges 66 into gripping relation with the work piece. Any suitable means (not shown) may be provided for actuating the ring 75 toward and from jaw closing position and for maintaining the jaw plates in contact with the ring. In the position shown in full lines in Fig. 14, where is is designated 65M, each jaw plate 65 is open to the maximum size permitted in the assembled chuck with the gripping edges 66 forming a cylinder of radius M. In the position shown in dot-dash lines at the right of Fig. 14, where it is designated 65C, the jaw plates 65 are contracted to the minimum size with the jaw edges 66 forming a cylinder of radius C. When the collet is detached from the spindle 74, the jaw plates designated 65D and shown in dot and dash lines at the left of Fig. 14, are opened up to the radius D.

In a similar manner, Fig. 12 shows in full lines the jaw plates 65D in detached condition with their inner edges defining a cylinder of radius D; and in dot and dash lines the jaw plates 65M in maximum operating position with their inner edges defining a cylinder of radius M; and also in dot-dash lines the jaw plates 65C in fully contracted position with their inner edges defining a cylinder of radius C. The range of the chuck, therefore, is for work pieces having a radius lying anywhere between the radii of C and M, as shown in Fig. 12 and as indicated on a larger scale in Fig. 14. The shape of the rubber spacer link 64 is shown respectively in various stages; in Fig. 15 (detached condition) where the link 64D is under a relatively slight strain and the jaw plates 65D are relatively widely spaced; in Fig. 16 (maximum operating condition) in which the rubber link 64M is under relatively greater strain and the jaw plates 65M are relatively closer together; and finally in Fig. 17 (fully contracted condition) in which the rubber link 64C is under still greater strain and the jaw plates 65C are still closer together. The base portions of the rubber links 64 accommodate the metal jaws 65 in their movement toward contracted position by bulging outward to form a lopsided barrel shape as shown in Fig. 17. Each rubber link 64 is deformed in the same manner, at the same time and to the same extent as every other link 64 in the same chain. A similar operation takes place with respect to the links 71, each of which is under a slightly greater strain than the corresponding link 64 in the first chain. Thus, at any given stage of operation, as shown in Figs. 16 and 17, and at any intermediate stage, the metal jaw plates 65 are supported at precisely the same distance from the axis and in planes which are evenly spaced and precisely radial, or alternatively offset to the same extent. This is an important feature of the invention as it enables the work piece to be gripped with an even or uniform pressure around its circumference and to be supported with its center exactly in line with the axis of rotation of the chuck body 74. The advantages of uniformity of the flexible of rubber links and, therefore, of the spacing of the metal jaw plates, is believed to be due in part to the socket 35 (Fig. 1) of one link being completely filled by part of the conjugate link. By making the tapers and the diameter the same on the plug end as on the socket end of the link, the invention produces substantially a solid link. It has been found by experiment that this solid arrangement produces a uniformity of flexure that would not be attained if part of the socket were left unfilled.

If desired, the rubber links 64 or 71 may be cemented together as in the case of the form of invention described in connection with Fig. 1. However, this step is not necessary for the successful functioning of the collet because even at its maximum operating size (Fig 16), the spacers 64 are in tight contact with the jaws 65 and under compression.

The collet 63 has advantages over conventional collets in which the metal jaw plates are joined by a rubber mass which is molded as a unit. In such privor devices the mold is expensive to make and generally can be used only for a particular size of collet for any given mold. With the present invention, however, the mold for making the rubber spacer is relatively simple in construction and small in size and, therefore, less expensive to build. It is easier to operate because it produces only a rubber product rather than an assembly of a rubber mass and prearranged metal plates. The unit cost of the rubber spacer made by the mold is considerably less than previously, because the same spacer is duplicated many times in making a single collet.

The invention is especially suited to the manufacture of collets of exceptionally large size—say 8½" or 12" in gripping diameter. With this invention, it is no longer necessary to provide a different rubber mold and, therefore, different size rubber spacers, for each size collet.

The same spacer may be used in making collets of different size, either by using identical jaws with a different number of jaws per collet, or by using different size jaw plates in a uniform enclosure. Thus, the invention makes it economically feasible to manufacture only a few large size collets in a particular size, which is usually all that the trade demands.

If desired, the two rings of rubber spacer links 64 and 71, which are of the form shown in Fig. 1, may be replaced by a single ring of duplex links as shown in Fig. 8. Also, the invention is adapted to collets having short jaws which provide room for only one transverse hole, such as 68 in Figs. 13 and 14. In that case, it is desirable to make the spacer links in the form shown in Figs. 10 and 11 to prevent the jaw from swiveling about the axis of the link.

In the case of small collets, which have only a few jaws and a wide angle between them, it is perferable to use rubber spacers as shown in Fig. 2, where the angularity between the jaws is provided initially by the normal relaxed shape of the rubber spacer, instead of relying solely upon deformation of the rubber spacers to produce the angularlity, as in case of the collet 63 shown in Figs. 12, 15, 16 and 17.

Figs. 18–21 show a modified collet 77 comprising a series of metal jaw plates 78 arranged radially of the axis of the collet as before. Referring particularly to Fig. 19, each jaw plate 78 in the modified collet is somewhat longer when measured radially of the collet than axially thereof, with the inner edge 79 of the jaw extending axially to engage the work piece (not shown) and with the outer edge 81 inclined to fit the cam surface 73 on the chuck body 74 (Fig. 14). Each jaw has an inner transverse hole or bore 82 and two outer transverse holes 83, one near the high end, and the other near the low end of the jaw plate. Each hole 82 receives a rubber spacer link 84 and each hole 83 receives a rubber spacer link 85. Links 84 and 85 may have the same configuration as the link 25 of Fig. 1, or 64 or 71 of Fig. 14. When the collet 77 is in its detached condition, the inner edges 79 of the jaws form substantially a regular prism or cylinder having an apothem or radius as indicated by the arrow DD in Fig. 18. When the collet is in operating position in a machine tool, with the jaws at maximum operating diameter as shown in dotted lines in Fig. 18, the inner or clamping edges of the jaws define a cylinder of radius MM. When the collet 77 is contracted to its smallest size as shown in Fig. 21, and in dot-dash lines in Fig. 18, the inner edges of the jaws 78C are adapted to grip a workpiece along a cylindrical surface of radius CC.

In all operating positions of the jaws, ranging from the the maximum 78M to the fully clamped position 78C (Fig. 21), the jaws 78 are held uniformly spaced at the same angle of inclination with each other, and with their inner edges adapted to grip a cylinder having its axis precisely in alignment with the axis of the collet 77 and of the cam surface 73 (Fig. 14). This uniformity of spacing is made possible by the elasticity of the links and the peculiar configuration thereof which causes all links in the same ring to deform to the same degree in proportion to the applied stress. Referring to Fig. 20, it will be seen that even in the detached or relatively relaxed condition of the collet, the rubber links 84 and 85 are under some strain. Referring to Fig. 21, it will be seen that the rubber links 84 and 85 are strained further during the closing operation of the jaws 78, with the inner side of each link bulging to take on a barrel-shape.

The spacer links 84 (or 85) of the collet 77 of Figs. 18–21 may be of the same size as the spacer links 64 and 71 of Fig. 12 although designed for gripping a workpiece of much smaller diameter. Thus, the invention reduces manufacturing costs by providing interchangeability of parts of different collets. It is not feasible to make the rubber links 84 the same size as the links 85 because the diameters of the two toroidal rings differ too greatly. However, it is possible to effect a further saving in the manufacturing cost of the links by making the plug and neck portions of link 84 identical in dimensions with the corresponding portions of link 85 and by making the remaining parts of the two links the same except for the difference in the axial length of the base portion. In this way, the same parts of the mold which is used to make the short link 84 can also be used in making the relatively long link 85 by the addition or substitution of another very simple cavity plate with a thickness to suit the desired length of the base portion.

If desired, the jaw plates 65 in the collet 63 (Fig. 12), or the jaw plates 78 in the collet 77 (Fig. 18) may be arranged in planes which are slightly off center with respect to the axis of the collet, in order to increase the gripping action on the workpiece. This could be accomplished by using spacers similar to those shown in Fig. 10 but with the base end and shoulder lying in planes which are parallel to each other and oblique with respect to the axis of the socket, neck and plug.

What is claimed is:

1. A machine tool collet comprising a plurality of angularly spaced rigid jaws and resilient means interconnecting the jaws to hold them yieldingly in predetermined spaced relation, with the outer edges of the jaws engageable with a conical cam surface in a chuck and the inner edges of the jaws engageable with a workpiece, characterized in that said resilient means comprising a series of links each of resilient material, said links being joined together and mechanically interlocked to form a substantially continuous ring.

2. A collet according to claim 1, in which one link is mounted in a transverse opening formed in an associated jaw and is joined to an adjacent link mounted in a similar opening formed in an adjacent jaw.

3. A collet according to claim 1, in which one link comprises a neck disposed within an opening in an associated jaw, a plug portion extending forwardly from the neck and a base extending rearwardly from the neck, the base having at its rear end a socket for the reception of the plug portion on a conjugate rearward link.

4. A collet according to claim 3, in which the base of the first mentioned link has a front shoulder engaging the rear face of the associated jaw and has a rear extremity engaging the front face of the rearward jaw, whereby each jaw is yieldingly held against lateral movement by engagement between the bases of two adjacent links.

5. A collet according to claim 3, in which the socket has a mouth of smaller size than the plug portion, said mouth being adapted to be spread apart by said plug portion during the reception thereof and to return to its original size with a snap action when assembled.

6. A collet according to claim 3, in which each socket is completely filled by the plug portion and part of the neck of the conjugate link, whereby the base of the assembled link is of substantially uniform cross section and substantially uniform flexural elasticity throughout its length.

7. A machine tool collet comprising a plurality of angularly spaced rigid jaws and resilient means interconnecting the jaws to hold them yieldingly in a predetermined spaced relation with the outer edges of the jaws engageable with a conical cam surface in a chuck and the inner edges of the jaws engageable with a work piece, said resilient means comprising a plurality of continuous rings each formed in sections and composed of individual prefabricated links secured together in mechanically interlocked relation.

8. A collet according to claim 7, in which each continuous ring has an individual link associated with each jaw, and in which each jaw has a plurality of spaced transverse openings to receive respectively the associated links in the plurality of rings.

9. In a collet for a chuck, an annular rope adapted to resiliently support a plurality of rigid jaws in predetermined spaced relation, said rope being sectional and comprising a series of links attached end to end in substantially toroidal relation, said links being resilient to permit the rope to be compressed in diameter but to expand back to normal size upon removal of the applied stress, each link having a portion insertable through an associated jaw and held in engagement therewith.

10. In a collet for a chuck, an annular rope adapted to resiliently support a plurality of rigid jaws in predetermined spaced relation, said rope being sectional and comprising a series of links attached end to end in substantially toroidal relation, said links being resilient to permit the rope to be compressed in diameter but to expand back to normal size upon removal of the applied stress, each link having a base provided with a socket at its rear end, or neck extending forwardly from the base and a plug portion in front of the neck, each socket being shaped to receive the plug portion and part of the neck of the conjugate rearward link, the neck being adapted to extend through an apertured jaw and the bases of adjacent links being engageable with the lateral faces of the jaw.

11. A connection between a plate and a sectional rod, said rod comprising a pair of links adapted to be coupled end to end and mechanically interlocked, the rear link having a base provided with a shoulder on its front end, a neck projecting forward from the shoulder and a plug in front of the neck and defining the front end of the rear link, the plug and base each having a cross section exceeding that of the neck, the front link having a socket formed in its rear extremity, the socket having an enlarged portion adapted to receive the plug of the rear link, and having a mouth to receive the neck of the rear link, the base of the front link being made of resilient material whereby the plug may be forced into the recess by temporarily widening the mouth, and the latter may be restored to its original size as it approaches the neck, the neck being longer than the mouth thus providing a space between the shoulder on the rear link and the rear extremity of the front link, and a plate supported by the sectional rod, said plate having an aperture surrounding the neck of the rear link and being confined laterally between the shoulder and rear extremity last mentioned.

12. A connection between a plate and a sectional rod as defined in claim 11 in which the neck has a non-circular cross-section and the aperture in the plate is correspondingly shaped to prevent swiveling of the plate about the neck.

13. In a collet for a chuck a plurality of rigid jaws and a plurality of resilient spacer links for supporting the jaws, each link made of rubber-like material and adpated to be attached end-to-end with a series of similar links to form an elastic annulus, said link comprising a base, a neck extending forward from the base and a plug portion at the front end of the neck, the base being recessed at its rear end providing a socket for the reception of the plug portion of a conjugate link, the mouth of the socket being relatively narrow to require the plug portion to be forced therethrough into operative position in the socket with a snap action, the mouth being shaped to receive a part of the neck.

14. In a collet for a chuck, a resilient spacer link according to claim 13, in which the neck is longer than the axial length of the mouth to provide a space between the bases of adjacent links for the reception of a chuck jaw.

15. In a collet for a chuck, a link according to claim 14, in which the front end of the base provides a shoulder lying in a plane at an acute angle to the plane of the rear extremity of the base, whereby the jaws are supported in a correspondingly angular relation in the unstressed assembled condition of the links.

References Cited in the file of this patent
UNITED STATES PATENTS

| | | |
|---|---|---|
| 890,336 | Coates | June 9, 1908 |
| 897,349 | Coates | Sept. 1, 1908 |
| 2,013,771 | Tompkins | Sept. 10, 1935 |
| 2,346,706 | Stoner | Apr. 18, 1944 |
| 2,535,105 | Vidal | Dec. 26, 1950 |